(12) United States Patent
Morikawa et al.

(10) Patent No.: US 6,482,523 B1
(45) Date of Patent: Nov. 19, 2002

(54) ADHESIVE FOR LAMINATION

(75) Inventors: Yukihiro Morikawa, Yokohama (JP); Hiroyoshi Yano, Yokohama (JP); Ichiro Higashikubo, Yokohama (JP); Toshiaki Sasahara, Yokohama (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 0 days.

(21) Appl. No.: 09/280,006

(22) Filed: Mar. 29, 1999

(51) Int. Cl.$^7$ .......................... B32B 27/00; B32B 27/40
(52) U.S. Cl. ............. 428/423.1; 428/412; 428/423.7; 428/424.2; 428/424.8; 428/425.8
(58) Field of Search ................. 428/343, 344, 428/354, 355 R, 355 EN, 355 BL, 355 CN, 355 N, 412, 458, 423.1, 423.7, 424.2, 424.8, 425.8; 528/44, 45, 59, 66, 85, 361, 425

(56) References Cited

U.S. PATENT DOCUMENTS

| | | | | |
|---|---|---|---|---|
| 4,041,208 A | * | 8/1977 | Seeger et al. | 428/425.6 |
| 4,147,679 A | * | 4/1979 | Scriven et al. | 204/478 |
| 4,321,307 A | * | 3/1982 | Bragole et al. | 428/423.1 |
| 4,704,445 A | * | 11/1987 | Komiya et al. | 528/49 |
| 4,731,292 A | * | 3/1988 | Sasaki et al. | 428/425.9 |
| 4,788,103 A | * | 11/1988 | Okita et al. | 428/425.9 |
| RE34,523 E | * | 1/1994 | Daude et al. | 428/423.3 |
| 5,554,686 A | * | 9/1996 | Frisch, Jr. et al. | 524/588 |
| 5,700,867 A | * | 12/1997 | Ishiyama et al. | 524/539 |
| 5,840,823 A | * | 11/1998 | Licht et al. | 523/73 |
| 5,874,502 A | * | 2/1999 | Carlson et al. | 525/123 |
| 5,900,457 A | * | 5/1999 | Duan et al. | 427/372.2 |

FOREIGN PATENT DOCUMENTS

| | | |
|---|---|---|
| JP | 03-046034 | 7/1991 |
| JP | 03-068916 | 10/1991 |
| JP | 05-112766 | 5/1993 |
| JP | 05-263060 | 10/1993 |
| JP | 08-060131 | 3/1996 |

\* cited by examiner

*Primary Examiner*—James J. Seidleck
*Assistant Examiner*—Travis B. Ribar
(74) *Attorney, Agent, or Firm*—Browdy and Neimark

(57) ABSTRACT

An adhesive for lamination which comprises a resin whose dynamic wettability to a film substrate is at least 0.20 mN alone or in combination with a polyisocyanate curing agent, said adhesive for lamination having a good adhesiveness to a film substrate such as a plastic film, a metal foil, a metallized film or paper.

24 Claims, 1 Drawing Sheet

ADHESIVE FOR LAMINATION

BACKGROUND OF THE INVENTION

1. Field of the Invention

This invention relates to an adhesive for lamination which is good in adhesiveness to all substrates such as plastic films, metal foils, metallized films, paper and the like.

2. Related Prior Art

As an adhesive for laminating various plastic films, metal foils, metallized films, paper and the like, there have been used synthetic resins such as polyurethane resin, vinyl acetate resin, acrylic resin, polyamide resin, epoxy resin and the like; natural resins such as hide glue, casein, gelatine, starch, cellulose and the like; etc. Among them, adhesives for lamination in which a synthetic resin is used are the main current in respects of easiness of molecular design, high productivity and the like, and particularly those in which polyurethane resin is used have been widely employed from the viewpoint of excellent bonding performance, durability, heat resistance and the like, from the viewpoint of broad range of applicability to various films, and the like.

One of the properties required for adhesives is that the adhesives indicate good wettability to film substrates. The adhesive-coating step in a process for producing a laminate film is generally to coat an adhesive on a film while the film is moved at a high speed. Accordingly, the "wettability" required for adhesives for lamination includes not only the conventional "static wettability" but also the "dynamic wettability" to a film which is moving at a high speed. As to the adhesives for lamination which have been known by now, such a viewpoint has been lacking, and hence, troubles have often been caused such as bad appearance of laminate film, lack of bonding strength due to bad coating of adhesive, and the like.

In addition, the laminate film is produced in many cases by laminating two films having different properties to each other, for example, laminating an aluminum foil to a polyethylene film, a polyethylene terephthalate film to a polypropylene film, or the like, depending upon the required properties such as gas barrier property, heat-sealing property and the like. However, there have been known no appropriate adhesives which have good wettability to both of such diverse films as in bonding a polyethylene film to a polyethylene terephthalate film, bonding a polypropylene film to a nylon film, bonding a polyethylene terephthalate film to an aluminum foil, and the like.

The present inventors have made diligent examination for solving such problems, and have consequently found that the above-mentioned problems can be solved by adhesives for lamination in which a resin having a wettability of at least the specified value with regard to various films is used, whereby this invention has been accomplished.

SUMMARY OF THE INVENTION

An object of this invention is to provide an adhesive for lamination comprising a resin having a specific dynamic wettability.

Another object of this invention is to provide an adhesive for lamination which comprises a resin having a specific dynamic wettability and a polyisocyanate curing agent.

Other objects and advantages of this invention will become apparent from the following description.

According to this invention, there is provided an adhesive for lamination which comprises a resin whose dynamic wettability to a film substrate is at least 0.20 mN.

According to this invention, there is further provided an adhesive for lamination which comprises a resin whose dynamic wettability to a film substrate is at least 0.20 mN and a polyisocyanate curing agent.

DETAILED DESCRIPTION OF THE INVENTION

Figure 1:
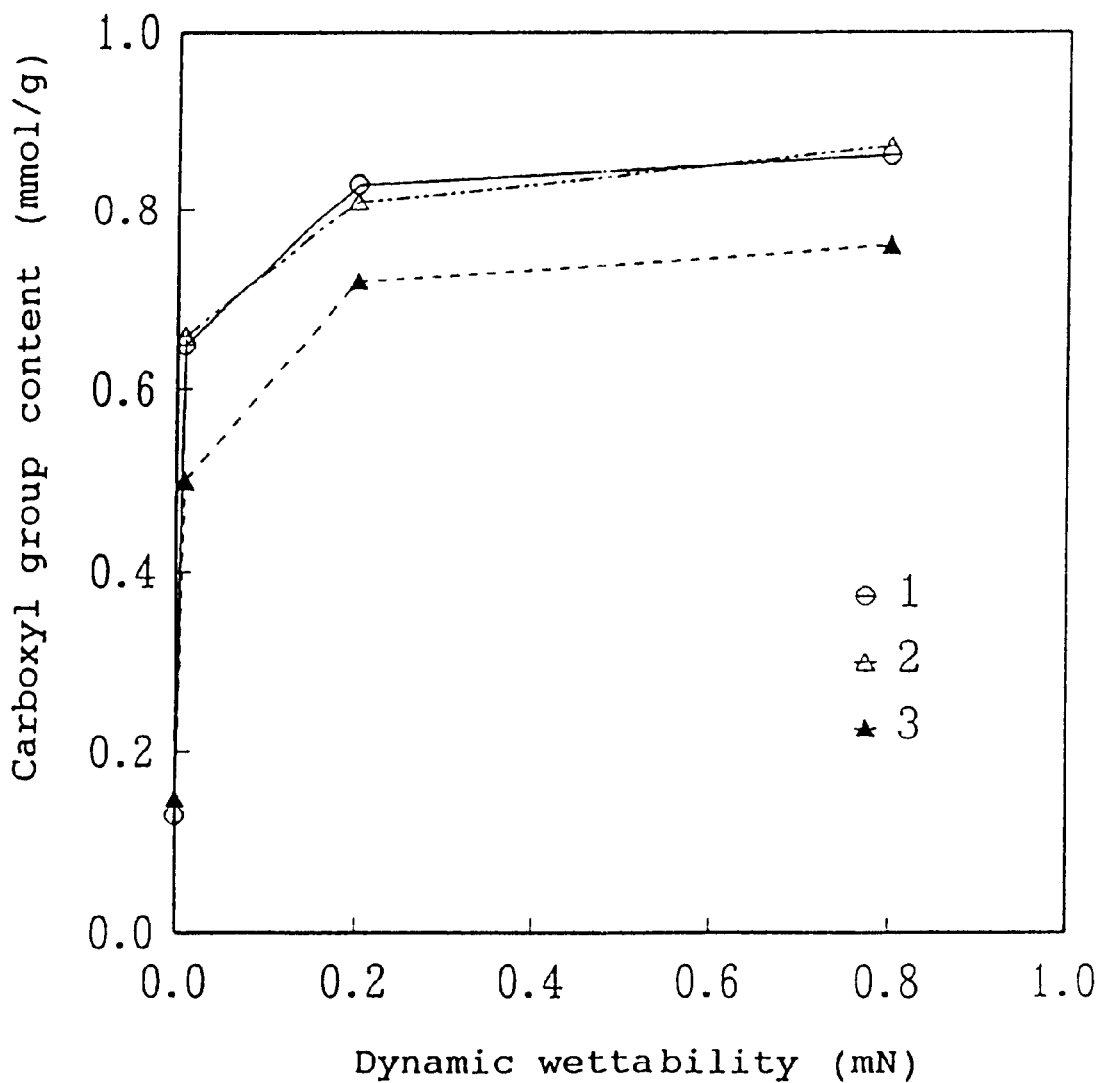
FIG. 1 is a graph showing a relation between the amount of carboxyl group introduced into polyurethane resin and the wettability to various film substrates in a mode for carrying out this invention.

The resin used in this invention is a resin whose dynamic wettability to a film substrate is at least 0.20 mN as measured under the conditions shown in the Wilhelmy method, and preferable are resins having a dynamic wettability of at least 0.20 mN with regard to at least one film substrate selected from the group consisting of polypropylene (referred to hereinafter as PP) film, polyethylene terephthalate (referred to hereinafter as PET) film and aluminum foil. Specifically, more preferable are resins which can be dissolved in ethyl acetate to form an ethyl acetate solution having a solid content of 25% by weight such as polyurethane resin, vinyl acetate resin, acrylic resin, polyamide resin, polyester resin, ionomer resin, epoxy resin, acrylic urethane resin, terminally carboxylated polyolefin, polydiene, synthetic rubber type resin and the like. When a resin whose dynamic wettability is less than 0.20 mN is used, the cured adhesive layer in the laminate film becomes nonuniform, so that it tends to cause a trouble in the production of a laminate film such as generation of delamination or the like. Incidentally, the resin used in this invention is preferably a resin which gives a sufficient bonding strength even when films of different kinds as well as films of the same kind are laminated to each other and which has a dynamic wettability of at least 0.20 mN with regard to each of the two kinds of film substrates, particularly preferably a resin which has a dynamic wettability of at least 0.20 mN with regard to each of three kinds of film substrates. Incidentally, the resins can be used alone or in admixture of two or more.

[Conditions for Measuring Dynamic Wettability]

Resin: Prepared in the form of a solution in ethyl acetate having a solid content of 25% by weight.

Apparatus: Dynamic wettability tester WET-6000 (manufactured by RHESCA CO., LTD.).

Substrate

PP film: RXC-11 (a trade name of TOSERO Co., Ltd., thickness: 70μ), which is an unoriented film whose one side has been corona-treated.

PET film: E-5100 (a trade name of TOYOBO CO., LTD., thickness: 12μ), whose one side has been corona-treated.

Aluminum foil: Arumihaku C (a trade name of TOYO ALUMINIUM K.K., thickness: 15μ).

Size of substrate sample: 20 mm×20 mm.

Measurement temperature: 25° C.

Immersion time: 1 second.

Immersion depth: 9.9 mm.

Immersion rate: 10 mm/sec.

Measured maximum range: 10 mN.

Measured value: Maximum value in forward wetting.

Measurement procedure: Measurement is effected according to the Manual attached to apparatus.

When other properties required for the adhesive for lamination, for example, heat resistance and flexibility, are taken into consideration, the resin is preferably a polyurethane resin, more preferably a polyurethane resin having carboxyl group in a proportion of 0.01 to 10.0 mmol/g, and most preferably a polyurethane resin having carboxyl group in a proportion of 0.03 to 8.0 mmol/g. When the carboxyl group content of the polyurethane resin is smaller than the lower limit, the adhesiveness to a metallic film substrate tends to become lacking. Moreover, when the carboxyl group content exceeds the upper limit, the viscosity becomes too high and the workability tends to become bad.

The most preferable polyurethane resin to be used in this invention is a resin obtained by reacting the following component (A) with the following component (B) or the following component (A) with the following component (C):

(A) An organic polyisocyanate.
(B) A carboxyl group-containing, low molecular weight polyol having a number average molecular weight of not more than 300 or a mixture of this low molecular weight polyol with other compounds having an active hydrogen-containing group.
(C) A carboxyl group-containing polylactone polyol in which a carboxyl group-containing, low molecular weight polyol having a number average molecular weight of not more than 300 is used as an initiator or a mixture of this polylactone polyol with other compounds having an active hydrogen-containing group than the polylactone polyol.

The organic polyisocyanate (A) includes, for example, aromatic diisocyanates such as 2,4-tolylene diisocyanate, 2,6-tolylene diisocyanate, 4,4'-diphenyl-methane diisocyanate, 2,4'-diphenylmethane diisocyanate, 2,2'-diphenylmethane diisocyanate, 1,5-naphthalene diisocyanate, 1,4-naphthalene diisocyanate, p-phenylene diisocyanate, m-phenylene diisocyanate, o-xylylene diisocyanate, m-xylylene diisocyanate, p-xylylene diisocyanate, tetramethylxylylene diisocyanate, 4,4'-diphenyl ether diisocyanate, 2-nitrodiphenyl-4,4'-diisocyanate, 2,2'diphenylpropane-4,4'-diisocyanate, 3,3'-dimethyldiphenyl-methane-4,4'-diisocyanate, 4,4'-diphenylpropane diisocyanate, 3,3'-dimethoxydiphenyl-4,4'-diisocyanate and the like; aliphatic diisocyanates such as tetramethylene diisocyanate, hexamethylene diisocyanate, 2-methyl-1,5-pentane diisocyanate, 3-methyl-1,5-pentane diisocyanate, lisyne diisocyanate and the like; alicyclic diisocyanates such as isophorone diisocyanate, hydrogenated diphenylmethane diisocyanate, hydrogenated tolylene diisocyanate, hydrogenated xylylene diisocyanate, hydrogenated tetramethylxylylene diisocyanate, cyclohexyl diisocyanate and the like; and mixtures of at least two members selected from the above-mentioned diisocyanates. Moreover, there can also be used modified polyisocyantes, such as adducts of the above diisocyanates, biuret bond-containing polyisocyanates derived from the above diisocyanates, carbodiimide group-containing polyisocyanates derived from the above diisocyanates, uretonimine bond-containing polyisocyanates derived from the above diisocyanates, uretdione bond-containing polyisocyanates derived from the above diisocyanates, isocyanurate bond-containing polyisocyanates derived from the above diisocyanates and the like; and so-called polymers thereof such as polymethylenepoly-phenylene polyisocyanate and the like.

Incidentally, polyurethane resins obtained by reacting an aliphatic diisocyanate such as hexamethylene diisocyanate or the like as the organic polyisocyanate (A) with the carboxyl group-containing, low molecular weight polyol having a number average molecular weight of not more than 300 are preferable as the adhesives for lamination because the balance of bonding strength and tack tends to become good.

Furthermore, polyurethane resins obtained by reacting an aromatic diisocyanate such as 2,4-tolylene diisocyanate, 2,6-tolylene diisocyanate, 4,4'-diphenylmethane diisocyanate or the like and/or an alicyclic diisocyanate such as isophorone diisocyanate, hydrogenated diphenylmethane diisocyanate, hydrogenated xylylene diisocyanate or the like as the organic polyisocyanate (A) with the carboxyl group-containing polylactone polyol in which a carboxyl group-containing, low molecular weight polyol having a number average molecular weight of not more than 300 is used as an initiator are preferable as adhesives for lamination because the balance of bonding strength and tack tends to become good.

The carboxyl group-containing, low molecular weight polyol having a number average molecular weight of not more than 300 as the component (B) includes specifically carboxyl group-containing polyols such as 2,2-dimethylolpropionic acid (referred to hereinafter as DMPA), 2,2-dimethylolbutanoic acid (referred to hereinafter as DMBA), 2,2-hydroxyethylpropionic acid, 2,2-hydroxyethylbutanoic acid and the like. These can be used alone or in admixture. The carboxyl group-containing, low molecular weight polyols having a number average molecular weight of not more than 300 is reacted with an isocyanate group to form a polyurethane resin in which the carboxyl group is not present at the end of molecule but present in the molecule in the form of a pendant. In this invention, as the carboxyl group-containing, low molecular weight polyol having a number average molecular weight of not more than 300, DMPA and/or DMBA is particularly preferable. Incidentally, in this invention, the term "low molecular weight" means that the number average molecular weight is not more than 300 as measured by a gel permeation chromatography. Moreover, the method of measuring the number average molecular weight of the polyurethane resin is the same as mentioned above.

The carboxyl group-containing, low molecular weight polyol having a number average molecular weight of not more than 300 used as the initiator in the production of the carboxyl group-containing polylactone polyol (C) is preferably DMPA and/or DMBA. When the carboxyl group containing polylactone polyol (C) obtained by reacting a cyclic ester and the polyol initiator is reacted with the organic polyisocyanate (A), it follows that in the polyurethane resin obtained, the carboxyl groups are not present at the end of molecule but present in the molecule in the form of a pendant. Furthermore, the carboxyl group-containing polylactone polyol has preferably a number average molecular weight of 300 to 10,000, particularly preferably 500 to 5,000.

Other initiators which can be used in combination with the carboxyl group-containing, low molecular weight polyol having a number average molecular weight of not more than 300 include carboxyl group-free low molecular weight polyols such as ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, 1,4-cyclohexanedimethanol, adducts of bisphenol A to alkylene oxides such as ethylene oxide, propylene oxide and the like, trimethylolpropane, glycerine, pentaerythritol and the like; low molecular weight polyamines such as hexamethylenediamine, xylenediamine, isophoronediamine and the like; low molecular weight aminoalcohols such as monoethanolamine, diethanolamine and the like; etc. Also, polyester polyols, polycarbonate polyols, polyether polyols and the like as mentioned hereinafter may also be used. These can be used alone or in admixture.

Other components than the initiators which are used in the production of the carboxyl group-containing polylactone polyol (C) include cyclic esters such as ε-caprolactone, γ-valerolactone and the like.

The compounds having an active hydrogen-containing group which can be used in combination with the component (B) or (C) include long chain polyols and chain extenders. These long chain polyols and chain extenders are free from carboxyl group.

The above long chain polyols include polyester polyols, polycarbonate polyols, polyether polyols, polyolefin polyols, animal and vegetable type polyols, copolyols thereof and the like. These long chain polyols may be used alone or in admixture of two or more. The number average molecular weights of these long chain polyols are preferably 300 to 10,000, particularly preferably 500 to 5,000. When the number average molecular weight is less than 300, the adhesiveness to a film substrate tends to become insufficient. In addition, when the number average molecular weight exceeds 10,000, the durability tends to become insufficient. In this invention, polyurethane resins in which 30 to 90% by weight of the long chain polyol is used are preferable.

The above-mentioned polyester polyol includes polyesters and polyesteramides obtained by condensation reaction of at least one member selected from the group consisting of known polycarboxylic acids such as succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid, naphthalenedicarboxylic acid, trimellitic acid and the like; esters of the polycarboxylic acids; and anhydrides of the polycarboxylic acids with at least one member selected from the group consisting of the carboxyl group-free low molecular weight polyols, low molecular weight polyamines and low molecular weight aminoalcohols which are used as the initiators in the production of the above-mentioned polylactone polyols. Also, it includes active hydrogen-containing group-terminated lactone polyesters obtained by ring-opening polymerization of a cyclic ester (lactone) monomer such as ε-caprolactone, γ-valerolactone or the like with the carboxyl group-free, low molecular weight polyol, low molecular weight polyamine or low molecular weight aminoalcohol which is used as the initiator.

The polycarbonate includes those obtained by dealcoholation reaction of a low molecular polyol with diethylene carbonate, dimethyl carbonate, diethyl carbonate, diphenyl carbonate or the like. This low molecular weight polyol includes those used in the production of the above-mentioned polyester polyol.

The polyether polyol includes polyethylene glycols, polypropylene glycols, polytetramethylene ether glycols and the like obtained by ring-opening polymerizing ethylene oxide, propylene oxide, tetrahydrofuran or the like with the low molecular weight polyol, low molecular weight polyamine or low molecular weight aminoalcohol (as an initiator) which are used in the production of the above-mentioned polyester polyol; and polyether polyols obtained by copolymerizing the polyethylene glycols, polypropylene glycols, polytetramethylene glycols and the like; and polyesterether polyols in which the above mentioned polyester polyol or polycarbonate polyol is used as an initiator.

The polyolefin polyol includes, for example, hydroxyl group-containing polybutadiene, hydrogenated hydroxyl group-containing polybutadiene, hydroxyl group-containing polyisoprene, hydrogenated hydroxyl group-containing polyisoprene, hydroxyl group-containing chlorinated polypropylene, hydroxyl group-containing chlorinated polyethylene and the like.

The animal and vegetable type polyols include castor oil type polyol, silk fibroin and the like.

Moreover, resins such as epoxy resins, polyamide resins, polyester resins, acrylic resins, rosin resins, urea resins, melamine resins, phenolic resins, coumaron resins, polyvinyl alcohol and the like and derivatives thereof can be appropriately used as far as they have a number average molecular weight of 300 to 10,000 and have an active hydrogen-containing group.

The chain extender is generally a compound having a number average molecular weight of less than 500 and having at least two active hydrogen-containing groups in the molecule, and includes specifically the above-mentioned low molecular weight polyols, low molecular weight polyamines and low molecular weight aminoalcohols and the like.

The final equivalent ratio of the isocyanate group to the active hydrogen-containing group in obtaining the carboxyl group-containing polyurethane resin is such a ratio as to satisfy the conditions under which no gelation is caused during the reaction and which are determined by suitably selecting such factors as the target number average molecular weight, the average NCO functionality of the organic polyisocyanate, the average number of functional groups of the compound having an active hydrogen-containing group and the like. The blending ratio is according to the gelation theory which has been theoretically calculated by J. P. Flory, Khun et al.; however, in fact, it can be produced by reacting them at a blending ratio in which the reactivity ratio of the reactive groups contained in the above-mentioned components has been taken into consideration.

In the reaction of the active hydrogen-containing group with the isocyanate group, a urethanization catalyst can, if necessary, be used. Specifically mentioned are organometallic compounds such as dibutyltin dilaurate (referred to hereinafter as DBTDL), dioctyltin dilaurate and the like; organic amines such as triethylenediamine, triethylamine and the like; and salts thereof. Incidentally, the temperature for reacting the active hydrogen-containing group with the isocyanate group is preferably 30 to 120° C., particularly preferably 50 to 100° C.

Moreover, the synthesis can be conducted by a one-shot method in which a compound having an active hydrogen-containing group is reacted with an organic polyisocyanate at one time or a prepolymer method in which an isocyanate group-terminated or active hydrogen-containing group-terminated prepolymer is first obtained and then subjected to extension reaction through a compound having an active hydrogen-containing group or an organic polyisocyanate. Furthermore, at this time, if necessary, there may be used a single organic solvent or a mixture of at least two organic solvents selected from the group consisting of aromatic solvents such as toluene, xylene and the like; ketone type solvents such as acetone, methyl ethyl ketone, cyclohexanone and the like; ester type solvents such as ethyl acetate, butyl acetate and the like; ether type solvents such as dimethyl ether, diethyl ether, 1,4-dioxane, tetrahydrofuran and the like; alcohol type solvents such as methanol, ethanol, isopropanol and the like; dimethylformamide; dimethylacetamide; N-methyl-pyrrolidone; pyridine; and the like. Of course, it is possible to conduct the reaction in the absence of the solvent.

The number average molecular weight of the carboxyl group-containing polyurethane resin thus obtained is preferably 600 to 100,000, particularly preferably 800 to 50,000.

The carboxyl groups of the carboxyl group-containing polyurethane resin used in this invention may be neutralized with a neutralizing agent such as a basic material or the like, for example, an amine or an alkali, specifically triethylamine, sodium hydroxide or the like in order to enhance of the adhesiveness to a film substrate.

The adhesive for lamination of this invention can be used in combination with a polyisocyanate curing agent for the purpose of enhancement of bonding strength and durability. As the polyisocyanate curing agent, there are mentioned those organic polyisocyanates which are used in the production of the above-mentioned carboxyl group-containing polyurethane resin, and the like, and as specific commercial products thereof, there are mentioned Coronate L, Coronate HL, Coronate HX and Coronate 2030 (these are trade names of NIPPON POLYURETHANE INDUSTRY CO., LTD.) and the like.

Among the above-mentioned polyisocyanate curing agents, preferable is a hydrophilic polar group-containing polyisocyanate curing agent obtained by reacting an organic polyisocyanate with a hydrophilic polar group-containing compound having at least one active hydrogen-containing group because the adhesiveness becomes good. This hydrophilic polar group-containing polyisocyanate curing agent is preferably a polyisocyanate having a hydrophilic polar group introduced into an at least isocyanurate bond-containing polyisocyanate derived from an aliphatic or alicyclic diisocyanate because it is excellent in heat resistance and the like. As the aliphatic or alicyclic diisocyanate, preferable are hexamethylene diisocyanate, isophorone diisocyanate and hydrogenated xylylene diisocyanate.

As the hydrophilic polar group of the hydrophilic polar group-containing compound having an active hydrogen-containing group, there are mentioned nonionic polar groups, anionic polar groups and cationic polar groups. These hydrophilic polar groups may be at least two hydrophilic polar groups of the same kind or different kinds. In view of the stability of the polyisocyanate curing agent obtained, the hydrophilic polar group to be introduced is preferably a nonionic polar group.

As the nonionic polar group-containing compound having an active hydrogen-containing group, there are mentioned poly(oxyalkylene) ether monools, poly(oxyalkylene) ether polyols, poly(oxyalkylene) fatty acid ester monools and the like in which the ethylene oxide unit is in a proportion of at least 50 mole % and the number of repeated units is preferably 3 to 90, more preferably 5 to 50. In this invention, preferable are the poly(oxyalkylene) ether monools and the poly(oxyalkylene) ether polyols, and more preferable are the poly(oxyalkylene) ether monools.

As the initiator to be used in the production of the above poly(oxyalkylene) ether monools, there are mentioned methanol, ethanol, n-propanol, i-propanol, n-butanol, i-butanol, t-butanol, cyclohexanol, phenol and the like. As the initiator to be used in the production of the above poly(oxyalkylene) ether polyols, there are mentioned ethylene glycol, propylene glycol, aniline, trimethylolpropane, glycerin and the like. Among them, preferable are compounds having 5 or less carbon atoms such as methanol, ethanol, ethylene glycol, propylene glycol and the like because these are good in adhesiveness to a metallic film substrate and more preferable are monools having 5 or less carbon atoms such as methanol, ethanol and the like.

When a nonionic polar group is introduced, the ethylene oxide content in the polyisocyanate curing agent is preferably 0.1 to 40% by weight, particularly preferably 0.5 to 30% by weight, in terms of the solid content.

Incidentally, a hydrophobic group may be further introduced into the molecule of the hydrophilic polar group-containing polyisocyanate curing agent for the purpose of improving the compatibility and the like. The hydrophilic polar group-containing polyisocyanate into which a hydrophobic group has been introduced can be easily produced, for example, by reacting the above-mentioned hydrophilic polar group-containing polyisocyanate with a compound having a hydrophobic group and an active hydrogen-containing group. The compound having a hydrophobic group and an active hydrogen-containing group includes low molecular weight monools such as methanol, ethanol, n-propanol, i-propanol, n-butanol, i-butanol, t-butanol, pentanol, hexanol, heptanol, octanol, 2-ethyl-hexanol, benzyl alcohol, cyclohexanol, alkylene glycol monoalkyl ether and the like; low molecular weight primary monoamines such as ethylamine, butylamine, aniline and the like; low molecular weight secondary monoamines such as diethylamine, dibutylamine, methylaniline and the like; polyesters having an active hydrogen-containing group; polyethers having an active hydrogen-containing group whose ethylene oxide unit is in a proportion of less than 50 mole %; polycarbonates having an active hydrogen-containing group; polyolefins having an active hydrogen-containing group; hydroxy-higher fatty acids having at least 6 carbon atoms; esters of the hydroxy-higher fatty acids; and the like.

The average NCO functionality of the polyisocyanate curing agent in this invention is preferably 2.0 to 5.0, particularly preferably 2.0 to 4.0. When the average NCO functionality is less than the lower limit, the cross-linking density is small, so that the bonding strength tends to be insufficient. Moreover, when it exceeds the upper limit, the cross-linking density of the cured product becomes unnecessarily large, so that the flexibility of the cured adhesive layer tends to become insufficient.

The isocyanate content of the polyisocyanate curing agent in this invention is preferably 10 to 50% by weight, particularly preferably 15 to 45% by weight. When the isocyanate content is less than the lower limit, the cross-linking density becomes small, so that the bonding strength tends to become insufficient. Also, when the isocyanate content exceeds the upper limit, the cross-linking density of the cured product becomes unnecessarily large, so that the flexibility of the cured adhesive layer tends to become insufficient.

The blending ratio of the polyisocyanate curing agent to the resin (main ingredient) having a wettability of at least 0.20 mN is preferably 0.5 to 30 parts by weight, particularly preferably 1 to 20 parts by weight, of the curing agent per 100 parts by weight of the main ingredient in terms of the solid content. When the amount of the curing agent blended is less than the lower limit, the blending effect of the curing agent is difficult to obtain. Moreover, when the amount of the curing agent blended exceeds the upper limit, the excessive isocyanate group reacts with water and carboxyl group to generate carbon dioxide, so that delamination and the like tend to be caused.

The adhesive of this invention can be appropriately blended, if necessary, with additives such as catalyst, coupling agent, antioxidant, ultraviolet absorber, pigment, dye, flame retardant, hydrolysis inhibitor, lubricant, plasticizer, filler, storage stabilizer and the like. In particular, the addition of a coupling agent is preferable because the improvement of workability and bonding strength can be expected.

The coupling agent includes silane coupling agent, titanate type coupling agent, aluminum type coupling agent and the like, and silane coupling agent is particularly preferable. The amount of the coupling agent added per 100 parts by weight of the polyurethane resin in terms of solid content is preferably 0.05 to 10.00 parts by weight, particularly preferably 0.1 to 5.00 parts by weight. This amount is determined taking into consideration the area of the substrate film coated with the coupling agent, the coating efficiency, bonding performance and the like.

As the silane coupling agent, preferable are vinylsilane compounds such as γ-methacryloxypropyltrimethoxysilane, vinyltriethoxysilane and the like; epoxy-silane compounds such as β-(3,4-epoxycyclohexyl)ethyltrimethoxysilane, γ-glycidoxypropyltrimethoxysilane and the like; aminosilane compounds such as γ-aminopropyltriethoxysilane, N-β-(aminoethyl)-γ-aminopropylmethyldimethoxysilane and the like; mercaptosilane compounds such as γ-mercaptopropyltrimethoxysilane and the like; etc. Particularly preferable are epoxysilane compounds for improving the adhesiveness.

An explanation is made below of a process for producing a laminate film using the adhesive for lamination of this invention.

The adhesive for lamination of this invention is the most suitable adhesive for obtaining a laminate film in which a metallic film substrate, for example, a metal foil such as an aluminum foil, copper foil or the like, or a metallized film such as a film coated with aluminum by vapor deposition or the like, is used, and the above adhesive is also suitable for obtaining other laminate films.

The film substrates to be used in the lamination include polyolefin films such as low density polyethylene film, high density polyethylene film, unoriented PP film, oriented PP film, polybutylene film and the like; polystyrene film; polyvinylidene chloride film; polyester films such as PET film, polybutylene terephthalate film, polyethylene naphthalate film, polybutylene naphthalate film and the like; nylon film; polyvinyl chloride film; ethylene-vinyl acetate copolymer film; ethylene-vinyl alcohol copolymer film; polyvinyl alcohol film; Cellophane film; ethylene-acrylate copolymer film; ionomer resin film; polycarbonate film; aluminum foil; copper foil; these films coated with aluminum by vapor deposition; these films coated with copper by vapor deposition; these films coated with a polymer; polymer-coated paper; and the like.

Incidentally, among the above films, plastic ones subjected to surface treatment such as corona discharge treatment or the like are preferable ones for improving the adhesive force. Moreover, in the case of the polymer-coated films, the kind, amount, surface characteristics and the like of the polymer to be coated on the films should be taken into consideration.

As to the laminating method, there can be applied such methods as wet lamination, dry lamination, hot melt lamination, nonsolvent lamination, extrusion lamination and the like.

The amount of the adhesive applied is preferably 0.5 to 10 g/m², particularly preferably 1 to 5 g/m², in terms of the solid content. When the amount of the adhesive applied is outside this range, the bonding strength tends to become insufficient.

As soon as the adhesive has been applied to the film substrates, the film substrates are laminated. Thereafter, if necessary, a pressure or heat is applied to the resulting assembly to accelerate the curing reaction.

By such a method, there can be produced not only a laminate in which two sheets of the film substrate are laminated but also a laminate in which at least three sheets of film substrate are laminated.

DESCRIPTION OF PREFERRED EMBODIMENTS

Examples are shown below to explain this invention in more detail. However, this invention should not be construed to be limited to the Examples. Incidentally, in Synthesis Examples, Examples and Comparative Examples, part and % are by weight unless otherwise specified.

[Synthesis of Polyurethane Resin]

Synthesis Example 1

In a reactor equipped with a stirring means, a thermometer, a nitrogen-sealing tube and a condenser were placed 389 parts of a polyol (referred to hereinafter as Polyol A), 51 parts of another polyol (referred to hereinafter as Polyol B) and 215 parts of ethyl acetate and Polyols A and B were dissolved in ethyl acetate at 50° C. Subsequently, 60 parts of IPDI and 0.1 part of DBTDL were placed therein and the resulting mixture was subjected to reaction at 70° C. for 5 hours. When the absorption peak of the isocyanate group in an infrared absorption analysis had disappeared, 285 parts of ethyl acetate was further added to dilute the reaction mixture, thereby obtaining a polyurethane resin having a solid content of 50% (referred to hereinafter as PU-A).

Synthesis Examples 2 to 10

In the same manner as in Synthesis Example 1, the components shown in Tables 1 and 2 were used to obtain polyurethane resins having a solid content of 50% (referred to hereinafter as PU-B to PU-J).

Synthesis Example 11

In the same reactor as in Synthesis Example 1 were placed 864 parts of a polyol (referred to hereinafter as Polyol C) and 51 parts of Polyol B and they were stirred at 50° C. for 1 hour to mix them. Subsequently, 85 parts of MDI was placed therein and the resulting mixture was subjected to reaction at 75° C. for 3 hours. It was confirmed that the absorption peak of the isocyanate group in an infrared absorption analysis had disappeared, and a polyurethane resin having a solid content of 100% (referred to hereinafter as PU-K) was obtained.

Synthesis Examples 12 to 14

In the same manner as in Synthesis Example 11, the components shown in Table 2 were used to obtain polyurethane resins having a solid content of 100% (referred to hereinafter as PU-L to PU-N).

The starting materials for the synthesis of PU-A to PU-N, the solid contents of PU-A to PU-N, the carboxyl group contents of PU-A to PU-N, the measurement results of number average molecular weights of PU-A to PU-N and the measurement results of dynamic wettabilities of PU-A to PU-N are shown in Tables 1 and 2.

[Method of Measurement of Wettability]
Apparatus: Dynamic wettability tester WET-6000 (manufactured by RHESCA CO., LTD.)
Substrate
  PP film: RXC-11 (a trade name of TOSERO Co., Ltd., thickness: 70μ)
  PET film: E-5100 (a trade name of TOYOBO CO., LTD., thickness: 12μ)
  Aluminum foil: Arumihaku C (a trade name of TOYO ALUMINIUM K.K., thickness: 15μ)
Polyurethane resin: Prepared in the form of an ethyl acetate solution having a solid content of 25%.
Size of substrate sample: 20 mm×20 mm
Measurement temperature: 25° C.
Immersion time: 1 second
Immersion depth: 9.9 mm
Immersion speed: 10 mm/sec
Measurement maximum range: 10 mN
Measured value: Maximum value in forward wetting.
Measurement procedure: Measured according to the manual attached to the apparatus.

TABLE 1

| | Synthesis Example | | | | | | | |
|---|---|---|---|---|---|---|---|---|
| | 1 | 2 | 3 | 4 | 5 | 6 | 7 | 8 |
| Long chain polyol (part) Polyol A | 389 | 446 | 305 | 456 | 462 | 436 | 352 | 350 |
| Carboxyl-containing polyol (part) Polyol B | 51 | | 124 | | | | | 75 |
| Carboxyl-containing low molecular weight polyol (part) | | | | | | | | |
| DMBA | | 3.7 | | | 0.8 | 14.8 | 59.3 | |
| DMPA | | | | 1.5 | | | | |
| Org. polyisocyanate (part) | | | | | | | | |
| IPDI | 60 | 51 | | | | | | |
| $H_6XDI$ | | | 60 | 43 | | | | |
| HDI | | | | | 37 | 49 | 89 | |
| MDI | | | | | | | | 75 |
| Urethanization catalyst (part) DBTDL | 0.1 | 0.1 | 0.1 | 0.1 | 0.1 | 0.1 | 0.1 | |
| Solvent (part) Ethyl acetate | | | | 500 | | | | |
| Polyurethane resin name | PU-A | PU-B | PU-C | PU-D | PU-E | PU-F | PU-G | PU-H |
| Solid content (%) | | | | 50 | | | | |
| Carboxyl content (mmol/g) | 0.2 | 0.05 | 0.5 | 0.02 | 0.01 | 0.2 | 0.8 | 0.3 |
| Number average mol. weight ($10^4$) | 2.5 | 2.1 | 3.0 | 2.1 | 1.9 | 1.8 | 1.7 | 1.4 |
| Dynamic wettability (mN) | | | | | | | | |
| PP | 0.70 | 0.62 | 0.76 | 0.54 | 0.65 | 0.83 | 0.86 | 0.57 |
| PET | 0.71 | 0.65 | 0.80 | 0.60 | 0.66 | 0.81 | 0.87 | 0.62 |
| Alum. foil | 0.55 | 0.48 | 0.60 | 0.44 | 0.50 | 0.72 | 0.76 | 0.41 |

TABLE 2

| | Synthesis Example | | | | | |
|---|---|---|---|---|---|---|
| | 9 | 10 | 11 | 12 | 13 | 14 |
| Long chain polyol (part) | | | | | | |
| Polyol A | 458 | 464 | | | | |
| Polyol C | | | 864 | 914 | 921 | 942 |
| Carboxyl-containing polyol (part) Polyol B | | | 51 | | | |
| Carboxyl-containing low mol. weight polyol (part) | | | | 16 | | |
| DMBA | | | | | | |
| Organic polyisocyanate (part) | | | | | | |
| $H_6XDI$ | 42 | | | | | |
| HDI | | 36 | | 70 | | 58 |
| MDI | | | 85 | | 79 | |
| Urethanization catalyst (part) DBTDL | 0.1 | 0.1 | | 0.1 | | 0.1 |
| Solvent (part) Ethyl acetate | 500 | 500 | | | | |
| Polyurethane resin name | PU-I | PU-J | PU-K | PU-L | PU-M | PU-N |
| Solid content (%) | 50 | 50 | 100 | 100 | 100 | 100 |
| Carboxyl group content (mmol/g) | | | | 0.1 | 0.1 | |
| Number average mol. weight ($10^4$) | 2.2 | 2.0 | 0.08 | 0.1 | 0.08 | 0.1 |
| Dynamic wettability (mN) | | | | | | |
| PP | 0.17 | 0.18 | 0.62 | 0.78 | 0.15 | 0.17 |

TABLE 2-continued

| | Synthesis Example | | | | | |
|---|---|---|---|---|---|---|
| | 9 | 10 | 11 | 12 | 13 | 14 |
| PET | 0.15 | 0.15 | 0.66 | 0.81 | 0.14 | 0.15 |
| Al foil | 0.12 | 0.15 | 0.54 | 0.62 | 0.06 | 0.10 |

In Synthesis Examples 1 to 14 and Tables 1 and 2,
Polyol A: Polyester diol (number average molecular weight: 2,000) obtained from ethylene glycol/neopentyl glycol = 1/1 (mole ratio) and sebacic acid/isophthalic acid = 1/1 (mole ratio).
Polyol B: Carboxyl group-containing polylactone polyol (number average molecular weight: 500) obtained by reacting DMBA (initiator) with ε-caprolactone.
Polyol C: Polyester diol (number average molecular weight: 700) obtained from ethylene glycol/neopentyl glycol/3-methyl-1,5-pentane glycol = 2/2/1 (mole ratio) and sebacic acid/isophthalic acid/adipic acid = 2/2/1 (mole ratio).
DMBA: 2,2-Dimethylolbutanoic acid.
DMPA: 2,2-Dimethylolpropionic acid.
IPDI: Isophorone diisocyanate.
H$_6$XDI: Hydrogenated xylylene diisocyanate.
HDI: Hexamethylene diisocyanate.
MDI: 4,4'-Diphenylmethane diisocyanate.
DBTDL: Dibutyltin dilaurate.
PP (film): RXC-11 (a trade name of TOSERO Co., Ltd., thickness: 70 μ).
PET (film): E-5100 (a trade name of TOYOBO CO., LTD., thickness: 12 μ).
Aluminum foil: Arumihaku C (a trade name of TOYO ALUMINIUM CO., LTD., thickness: 15 μ).

[Relation Between Carboxyl Group Content and Dynamic Wettability]

On PU-E, PU-F, PU-G and PU-J which are the same in starting material composition as and different in carboxyl group concentration in molecular chain from one another, the relation between the carboxyl group concentration and the dynamic wettability is shown in Table 3 in which the values in Tables 1 and 2 are arranged.

TABLE 3

| Carboxyl-containing polyurethane resin | Amount of carboxyl group introduced (mmol/g) | Substrate | | |
|---|---|---|---|---|
| | | PP | PET | Al |
| PU-E | 0.01 | 0.65 | 0.66 | 0.50 |
| PU-F | 0.2 | 0.83 | 0.81 | 0.72 |
| PU-G | 0.8 | 0.86 | 0.87 | 0.76 |
| PU-J | 0 | 0.13 | 0.15 | 0.15 |

As seen from Table 3, the wettability of the polyurethane resin to PP film, PET film and aluminum foil are remarkably enhanced by introducing carboxyl group into the molecular chain of the polyurethane resin.

[Synthesis of Polyisocyanate Curing Agent]

Synthesis Example 15

In the same reactor as in Synthesis Example 1 were placed 86 parts of C-HX which is an isocyanurate bond-containing polyisocyanate derived from hexamethylene diisocyanate and 14 parts of a monool (referred to hereinafter as Monool (1)) and they were subjected to reaction at 70° C. for 3 hours to obtain a polyisocyanate curing agent (referred to hereinafter as Curing Agent A). The isocyanate group content of Curing Agent A was 16.8%.

[Bonding Test]
(Formulation of Adhesive)

Adhesives for lamination (referred to hereinafter as AD-A to AD-N) were prepared with the formulation shown in Tables 4 and 5.

TABLE 4

| | Adhesive | | | | | | |
|---|---|---|---|---|---|---|---|
| | AD-A | AD-B | AD-C | AD-D | AD-E | AD-F | AD-G |
| Polyurethane resin (part) | | | | | | | |
| PU-A | 100 | | | | | | |
| PU-B | | 100 | | | | | |
| PU-C | | | 100 | | | | |
| PU-D | | | | 100 | | | |
| PU-E | | | | | 100 | | |
| PU-F | | | | | | 100 | |
| PU-G | | | | | | | 100 |
| Curing agent (part) | | | | | | | |
| C-HX | 7 | | 7 | | | | |
| C-HL | | 10 | | 10 | | | |
| C-L | | | | | | | |
| Curing Agent A | | | | | 7 | 7 | 7 |
| Coupling agent (part) | | | | | | | |
| A-186 | 0.5 | | 0.5 | | | | |
| A-187 | | | | | 0.5 | 0.5 | 0.5 |
| Solvent (part) Ethyl acetate | 121 | 120 | 121 | 120 | 121 | 121 | 121 |

TABLE 5

| | Adhesive | | | | | | |
|---|---|---|---|---|---|---|---|
| | AD-H | AD-I | AD-J | AD-K | AD-L | AD-M | AD-N |
| Polyurethane resin (part) | | | | | | | |
| PU-H | 100 | | | | | | |
| PU-I | | 100 | | | | | |
| PU-J | | | 100 | | | | |
| PU-K | | | | 100 | | | |
| PU-L | | | | | 100 | | |
| PU-M | | | | | | 100 | |
| PU-N | | | | | | | 100 |
| Curing agent (part) | | | | | | | |
| C-HX | | | 7 | | | | |
| C-HL | | | | | | | |
| C-L | 10 | | | | | | |
| Curing Agent A | | 7 | | 45 | 45 | 45 | 45 |
| Coupling agent (part) | | | | | | | |
| A-186 | | 0.5 | | | | | |
| A-187 | | | 0.5 | | | | |

TABLE 5-continued

| | Adhesive | | | | | | |
|---|---|---|---|---|---|---|---|
| | AD-H | AD-I | AD-J | AD-K | AD-L | AD-M | AD-N |
| Solvent (part) Ethyl acetate | 120 | 121 | 121 | | | | |

In Synthesis Example 15 and Tables 4 and 5,
C-L: Adduct of tolylene diisocyanate (Coronate L, a trade name of NIPPON POLYURETHANE INDUSTRY CO., LTD., solid content: 75%).
Monool (1): Methoxypoly(oxyethylene)monool (ethylene oxide unit: 100 mole %, number average molecular weight: 400).
C-HL: Adduct of hexamethylene diisocyanate (Coronate HL, a trade name of NIPPON POLYURETHANE INDUSTRY CO., LTD., solid content: 75%).
C-HX: Isocyanurate bond-containing polyisocyanate derived from hexamethylene diisocyanate (Coronate HX, a trade name of NIPPON POLYURETHANE INDUSTRY CO., LTD., solid content: 100%).
A-186: β-(3,4-Epoxycyclohexyl)ethyltrimethoxysilane (manufactured by NIPPON UNICAR CO., LTD.)
A-187: γ-Glycidoxypropyltrimethoxysilane (manufactured by NIPPON UNICAR CO., LTD.)

(Bonding Strength Measurement-1)

Example 1

AD-A, PP film, PET film and aluminum foil were set in a dry laminator. AD-A was coated on the corona-treated surface of the PET film on a gravure roll so that the dry weight of AD-A coated became 3.5 g/m². After the coating of the adhesive, the coated film was passed through a drying oven heated at 80° C. and then laminated to the aluminum foil by a laminating roll of 100° C.×0.3 MPa. Subsequently, AD-A was coated on the aluminum foil on a gravure roll so that the dry weight of AD-A coated became 3.5 g/m². After the coating of the adhesive, the coated aluminum foil was passed through a drying oven heated at 80° C. and then laminated to the corona-treated surface of the PP film by a laminating roll of 100° C.×0.3 MPa. Incidentally, the film speed was 50 m/min. After the lamination, the resulting assembly was cured at 40° C. for 3 days to obtain a laminate film (referred to hereinafter as Laminate Film A).

Laminate Film A was cut in a 15-mm width and then subjected to a T-peel test at a drawing speed of 300 mm/min in a measurement atmosphere of 25° C.×50% RH.

Moreover, three sides of Laminate Film A were heat-sealed so that the PP surface came to inside under the conditions of 180° C.×0.3 MPa×1 second to prepare a bag, and thereafter, this bag was filled with a mixture of catsup/salad oil/vinegar=1/1/1 (weight ratio) and then heat-sealed under the same conditions as mentioned above to close the bag. The bag was subjected to retort-treatment at 120° C. for 30 minutes and thereafter subjected to T-peel test (sample width: 15 mm, drawing speed: 300 mm/min, measurement atmosphere: 25° C.×50% RH).

Examples 2 to 8 and Comparative Examples 1 and 2

In the same manner as in Example 1, except that one of AD-B to AD-J was substituted for the AD-A, laminate films (referred to hereinafter as Laminate Film B to Laminate Film J, respectively) were prepared and then subjected to the same test as in Example 1.

The test results obtained in Examples 1 to 8 and Comparative Examples 1 and 2 are shown in Table 6.

TABLE 6

| | Adhesive | Bonding strength in normal state (gf/15 mm) | | Bonding strength after retort treatment (gf/15 mm) | |
|---|---|---|---|---|---|
| | | PET/Al | Al/CPP | PET/Al | Al/CPP |
| Example | | | | | |
| 1 | AD-A | 440PETf | 1060Alf | Impossible to peel | 1150Alf |
| 2 | AD-B | 500PETf | 1240Alf | Impossible to peel | 1160Alf |
| 3 | AD-C | 450PETf | 1060Alf | Impossible to peel | 1000Alf |
| 4 | AD-D | 420PETf | 1100Alf | Impossible to peel | 1160Alf |
| 5 | AD-E | 400PETf | 890Alf | Impossible to peel | 900Alf |
| 6 | AD-F | 500PETf | 1260Alf | Impossible to peel | 1100Alf |
| 7 | AD-G | 500PETf | 1380Alf | Impossible to peel | 1080Alf |
| 8 | AD-H | 400PETf | 1040Alf | Impossible to peel | 1000Alf |
| Comparative Example | | | | | |
| 1 | AD-I | 380PETf | 680 | 400PETf | 560 |
| 2 | AD-J | 300 | 560 | 370PETf | 450 |

In Examples 1 to 8, Comparative Examples 1 and 2 and Table 6,
PP (film): RXC-11 (a trade name of TOSERO Co., Ltd.).
PET (film): E-5100 (a trade name of TOYOBO CO., LTD.).
Aluminum foil: Arumihaku C (a trade name of TOYO ALUMINIUM K.K.).
PETf: PET material failed.
Alf: Aluminum foil material failed.

Tables 1, 3 and 6 are examined to find that with the adhesives for lamination in which polyurethane resins whose dynamic wettability is at least 0.2 mN is used, the results are obtained that both bonding strength in the normal state and bonding strength after retort-treatment are good. Moreover, particularly comparing AD-E, AD-F, AD-G and AD-J, it has been clarified that with the adhesives whose dynamic wettabilities have been enhanced by introducing a carboxyl group into the molecular chain of polyurethane resin, the bond performance thereof is also enhanced.

(Bonding Strength Measurement 2)

Example 9

AD-K was warmed to 60° C. and coated on the corona-treated surface of a PET film by a roll coater so that the amount of AD-K coated became 2.5 g/m². After the coating of the adhesive, the coated film was laminated to the aluminum-deposited surface of an unoriented linear low density polyethylene film coated with aluminum by vapor deposition (film thickness: 60μ) by a laminating roll of 100° C.×0.3 MPa. Incidentally, the film speed was 50 m/min. After the lamination, the resulting assembly was cured at 40° C. for 3 days to obtain a laminate film (referred to hereinafter as Laminate Film K).

Laminate Film K was cut as it was in a 15-mm width and then subjected to T-peel test at a drawing speed of 300 mm/min in a measurement atmosphere of 25° C.×50% RH.

Example 10 and Comparative Examples 3 and 4

In the same manner as in Example 9, except that one of AD-L to AD-N was substituted for the AD-K, laminate films (referred to hereinafter as Laminate Film L to Laminate Film N, respectively) were prepared and then subjected to the same test as in Example 9.

The test results obtained in Examples 9 and 10 and Comparative Examples 3 and 4 are shown in Table 7.

TABLE 7

| | | Adhesive | Bonding strength in normal state (gf/15 mm) PET/VM-LLDPE |
|---|---|---|---|
| Example | 9 | AD-K | 490PETf |
| | 10 | AD-L | 440PETf |
| Comparative Example | 3 | AD-M | 210 |
| | 4 | AD-N | 190 |

In Examples 9 and 10, Comparative Examples 3 and 4 and Table 7,

PET (film): E-5100.

VM-LLDPE: Unoriented linear low density polyethylene film (thickness: 60μ) coated with aluminum by vapor deposition.

PETf: PET material failed.

As described above, according to this invention, the use of a resin having a dynamic wettability of at least 0.2 mN makes it possible to provide an adhesive for lamination having good adhesiveness to various films and metal foils.

What is claimed is:

1. In a laminate comprising a base substrate and a film substrate laminated to said base substrate with an adhesive between said film substrate and said base substrate, the improvement comprising an adhesive made of
   a. a polyurethane resin having a dynamic wettability to a film substrate of at least 0.20 mN and
   b. a polyisocyanate curing agent said polyurethane resin being a polyurethane resin containing a carboxyl group in a proportion of 0.01 to 10.0 mmol/g obtained by reacting component (A), component (B) or (C), and component (D), wherein
   component (A) is an organic polyisocyanate;
   component (B) is a carboxyl group containing polyol having a number average molecular weight of not more than 300;
   component (C) is a carboxyl group containing polylactone polyol obtained by reacting a cyclic ester and a carboxyl group containing polyol having a number average molecular weight of not more than 300; and
   component (D) is a carboxyl group free polyol having a number average molecular weight of 500 to 5000.

2. The laminate according to claim 1 wherein the adhesive comprises a polyurethane resin obtained by reacting component (A) with component (B) and component (D).

3. The laminate according to claim 1 wherein the adhesive comprises a polyurethane resin obtained by reacting component (A) with component (C) and component (D).

4. The laminate according to claim 1 wherein said film substrate is selected from the group consisting of polypropylene film, polyethylene terephthalate film, and aluminum foil.

5. In a laminate comprising a base substrate and a film substrate laminated to said base substrate with an adhesive between said film substrate and said base substrate, the improvement comprising an adhesive comprising:
   a. a polyurethane resin having a dynamic wettability to a film substrate of at least 0.20 mN and
   b. a polyisocyanate curing agent;
   said polyurethane resin being a polyurethane resin containing a carboxyl group in a proportion of 0.01 to 10.0 mmol/g obtained by reacting component (A), component (B) or (C), and component (D), wherein
   component (A) is an organic polyisocyanate;
   component (B) is a carboxyl group-containing polyol having a number average molecular weight of not more than 300;
   component (C) is a carboxyl group-containing polylactone polyol obtained by reacting a cyclic ester and a carboxyl group-containing polyol having a number average molecular weight of not more than 300 used as an initiator; and
   component (D) is a carboxyl group-free polyol having a number average molecular weight of 500 to 5000.

6. The laminate according to claim 5, wherein the adhesive comprises a polyurethane resin obtained by reacting component (A) with component (B) and component (D).

7. The laminate according to claim 5, wherein the adhesive comprises a polyurethane resin obtained by reacting component (A) with component (C) and component (D).

8. The laminate according to claim 5, wherein component (A) is at least one diisocyanate selected from the group consisting of isophorone diisocyanate, hexamethylene diisocyanate, hydrogenated xylylene diisocyanate, and 4,4'-diphenylmethane diisocyanate.

9. The laminate according to claim 6, wherein component (A) is at least one diisocyanate selected from the group consisting of isophorone diisocyanate, hexamethylene diisocyanate, hydrogenated xylylene diisocyanate, and 4,4'-diphenylmethane diisocyanate.

10. The laminate according to claim 7, wherein component (A) is at least one diisocyanate selected from the group consisting of isophorone diisocyanate, hexamethylene diisocyanate, hydrogenated xylylene diisocyanate, and 4,4'-diphenylmethane diisocyanate.

11. The laminate according to claim 5, wherein component (B) is 2,2-dimethylolbutanoic acid.

12. The laminate according to claim 6, wherein component (B) is 2,2-dimethylolbutanoic acid.

13. The laminate according to claim 5, wherein component (C) is a carboxyl group-containing polylactone obtained by reacting epsilon-caprolactone or gamma-valerolactone with 2,2-dimethylolbutanoic acid.

14. The laminate according to claim 7, wherein component (C) is a carboxyl group-containing polylactone obtained by reacting epsilon-caprolactone or gamma-valerolactone with 2,2-dimethylolbutanoic acid.

15. The laminate according to claim 5, wherein component (D) is at least one member selected from the group consisting of polyester polyols, polycarbonate polyols, polyether polyols, polyolefin polyols, polyols of animal origin, polyols of vegetable origin, and copolyols thereof.

16. The laminate according to claim 6, wherein component (D) is at least one member selected from the group consisting of polyester polyols, polycarbonate polyols, polyether polyols, polyolefin polyols polyols of animal origin, polyols of vegetable origin, and copolyols thereof.

17. The laminate according to claim 7, wherein component (C) is at least one member selected from the group consisting of polyester polyols, polycarbonate polyols, polyether polyols, polyolefin polyols, polyols of animal origin, polyols of vegetable origin, and copolyols thereof.

18. The laminate according to claim 5, wherein the polyisocyanate curing agent is selected from the group consisting of an adduct of hexamethylene diisocyanate, and isocyanurate bond-containing polyisocyanate derived from hexamethylene diisocyanate, and a curing agent obtained by reacting methoxypoly(oxyethylene)monool with an isocyanurate bond-containing polyisocyanate derived from hexamethylene diisocyanate.

19. The laminate according to claim 6, wherein the polyisocyanate curing agent is selected from the group consisting of an adduct of hexamethylene diisocyanate, an isocyanurate bond-containing polyisocyanate derived from hexamethylene diisocyanate, and a curing agent obtained by reacting methoxypoly(oxyethylene)monool with an isocyanurate bond-containing polyisocyanate derived from hexamethylene diisocyanate.

20. The laminate according to claim 7, wherein the polyisocyanate curing agent is selected from the group consisting of an adduct of hexanethylene diisocyanate, an isocyanurate bond-containing polyisocyanate derived from hexamethylene diisocyanate, and a curing agent obtained by reacting methoxypoly(oxyethylene)monool with an isocyanurate bond-containing polyisocyanate derived from hexamethylene diisocyanate.

21. The laminate according to claim 5, wherein the adhesive is nonaqueous.

22. The laminate according to claim 5, wherein the adhesive further comprises an organic solvent.

23. The laminate according to claim 22, wherein the organic solvent is acetone.

24. The laminate according to claim 5, wherein the film substrate is selected from the group consisting of polypropylene film, polyethylene terephthalate film, and aluminum foil.

* * * * *